US011720856B2

(12) United States Patent
Kesiboyana et al.

(10) Patent No.: US 11,720,856 B2
(45) Date of Patent: *Aug. 8, 2023

(54) SYSTEM AND METHOD FOR PROVIDING API VERSION CONTROL

(71) Applicant: Capital One Services, LLC, McLean, VA (US)

(72) Inventors: Satish Kesiboyana, Plano, TX (US); Rajaboopathy Vijayaraghavan, Carrollton, TX (US); Pedro Betancourt, Mckinney, TX (US); David Gillam, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,624

(22) Filed: Jun. 3, 2022

(65) Prior Publication Data
US 2022/0292599 A1    Sep. 15, 2022

Related U.S. Application Data

(63) Continuation of application No. 16/882,286, filed on May 22, 2020, now Pat. No. 11,354,690.
(Continued)

(51) Int. Cl.
G06F 9/445      (2018.01)
G06Q 10/10     (2023.01)
(Continued)

(52) U.S. Cl.
CPC ......... *G06Q 10/10* (2013.01); *G06F 9/44505* (2013.01); *G06F 9/54* (2013.01);
(Continued)

(58) Field of Classification Search
CPC .... G06Q 40/025; G06Q 10/10; G06Q 20/382; G06Q 20/4014; G06Q 30/0185;
(Continued)

(56) References Cited

U.S. PATENT DOCUMENTS 8,433,650 B1    4/2013  Thomas
10,417,706 B1   9/2019  Simon
(Continued)

FOREIGN PATENT DOCUMENTS

AU    2015203014 A1    1/2016
EP       1175654 A2    1/2002
(Continued)

OTHER PUBLICATIONS

Nor and Yusof, Loan Assessment Through Internet, Jul. 17, 2002, IEEE, Student Conference on Research and Development, entire document (Year: 2002).
(Continued)

*Primary Examiner* — Chuck O Kendall
(74) *Attorney, Agent, or Firm* — Sterne, Kessler, Goldstein & Fox P.L.L.C.

(57) ABSTRACT

Described herein is a system for providing version control across APIs. In an embodiment, an application of a client device may transmit communications to a service application API that are in a format not accepted by the service application API, using the application API. A central (or public) API may receive the communication transmitted by the application's API. The central API may identify the versions of the application's API and the service application API. The central API may format the communication based on the mapped fields, to a format accepted by the service application API. The central API 106 may forward the formatted communication to the service application.

20 Claims, 4 Drawing Sheets

Related U.S. Application Data

(60) Provisional application No. 62/852,202, filed on May 23, 2019.

(51) Int. Cl.

| | | |
|---|---|---|
| *G06Q 30/0201* | (2023.01) | |
| *G06F 16/955* | (2019.01) | |
| *H04L 9/40* | (2022.01) | |
| *G06N 20/00* | (2019.01) | |
| *G06F 9/54* | (2006.01) | |
| *G06F 21/60* | (2013.01) | |
| *G06N 3/02* | (2006.01) | |
| *G06F 16/25* | (2019.01) | |
| *G06F 21/62* | (2013.01) | |
| *H04L 9/08* | (2006.01) | |
| *G06Q 20/40* | (2012.01) | |
| *G06Q 30/018* | (2023.01) | |
| *G06Q 30/0601* | (2023.01) | |
| *G06F 40/103* | (2020.01) | |
| *G06F 40/174* | (2020.01) | |
| *G06F 40/18* | (2020.01) | |
| *G06Q 40/02* | (2023.01) | |
| *G06F 21/53* | (2013.01) | |
| *G06N 5/025* | (2023.01) | |
| *G06Q 20/38* | (2012.01) | |
| *H04L 67/01* | (2022.01) | |
| *G06F 18/24* | (2023.01) | |
| *G06Q 40/03* | (2023.01) | |
| *G06F 8/65* | (2018.01) | |
| *G06F 8/71* | (2018.01) | |
| *G06K 7/14* | (2006.01) | |
| *G06Q 50/26* | (2012.01) | |

(52) U.S. Cl.
CPC ............ *G06F 9/547* (2013.01); *G06F 16/258* (2019.01); *G06F 16/9558* (2019.01); *G06F 16/9562* (2019.01); *G06F 18/24* (2023.01); *G06F 21/53* (2013.01); *G06F 21/602* (2013.01); *G06F 21/604* (2013.01); *G06F 21/6227* (2013.01); *G06F 21/6245* (2013.01); *G06F 40/103* (2020.01); *G06F 40/174* (2020.01); *G06F 40/18* (2020.01); *G06N 3/02* (2013.01); *G06N 5/025* (2013.01); *G06N 20/00* (2019.01); *G06Q 20/382* (2013.01); *G06Q 20/4014* (2013.01); *G06Q 30/0185* (2013.01); *G06Q 30/0206* (2013.01); *G06Q 30/0601* (2013.01); *G06Q 30/0613* (2013.01); *G06Q 30/0619* (2013.01); *G06Q 30/0637* (2013.01); *G06Q 30/0643* (2013.01); *G06Q 40/02* (2013.01); *G06Q 40/03* (2023.01); *H04L 9/0825* (2013.01); *H04L 63/0435* (2013.01); *H04L 63/08* (2013.01); *H04L 63/0815* (2013.01); *H04L 63/102* (2013.01); *H04L 63/123* (2013.01); *H04L 63/166* (2013.01); *H04L 63/168* (2013.01); *H04L 67/01* (2022.05); *G06F 8/65* (2013.01); *G06F 8/71* (2013.01); *G06F 2221/2107* (2013.01); *G06K 7/1417* (2013.01); *G06Q 50/265* (2013.01); *G06Q 2220/00* (2013.01); *H04L 9/0822* (2013.01)

(58) Field of Classification Search
CPC .......... G06Q 30/0206; G06Q 30/0601; G06Q 30/0613; G06Q 30/0619; G06Q 30/0637; G06Q 30/0643; G06Q 40/02; G06Q 50/265; G06Q 2220/00; G06F 16/9558; G06F 16/258; G06F 16/9562; G06F 40/103; G06F 40/174; G06F 40/18; G06F 9/44505; G06F 9/54; G06F 9/547; G06F 21/53; G06F 21/602; G06F 21/604; G06F 21/6227; G06F 21/6245; G06F 8/06; G06F 8/07; G06F 2221/2107; G06N 20/00; G06N 3/02; G06N 5/025; H04L 67/01; H04L 9/0825; H04L 63/0435; H04L 63/08; H04L 63/0815; H04L 63/102; H04L 63/123; H04L 63/166; H04L 63/168; H04L 9/0822; G06K 9/6267; G06K 7/1417
USPC .................................................. 717/168–172
See application file for complete search history.

(56) References Cited

U.S. PATENT DOCUMENTS

| | | | |
|---|---|---|---|
| 11,354,690 B2 * | 6/2022 | Kesiboyana | .......... H04L 63/102 |
| 2004/0117295 A1 | 6/2004 | Maliwanag | |
| 2014/0172531 A1 | 6/2014 | Liberty et al. | |
| 2014/0249991 A1 | 9/2014 | MacInnis | |
| 2015/0074644 A1 | 3/2015 | Oberheide et al. | |
| 2015/0206234 A1 | 7/2015 | Forrester et al. | |
| 2015/0379632 A1 | 12/2015 | Michael | |
| 2016/0171555 A1 | 6/2016 | Buerger et al. | |
| 2016/0267588 A1 | 9/2016 | Cain et al. | |
| 2016/0283203 A1 | 9/2016 | Li et al. | |
| 2016/0371770 A1 | 12/2016 | Porter | |
| 2018/0053253 A1 | 2/2018 | Gokhale et al. | |
| 2019/0138995 A1 | 5/2019 | Currin et al. | |
| 2020/0051153 A1 | 2/2020 | Chrzan et al. | |
| 2020/0371779 A1 | 11/2020 | Kesiboyana et al. | |
| 2020/0372519 A1 | 11/2020 | Repaka et al. | |
| 2020/0372531 A1 | 11/2020 | Kesiboyana et al. | |
| 2020/0372577 A1 | 11/2020 | Kesiboyana et al. | |

FOREIGN PATENT DOCUMENTS

| | | |
|---|---|---|
| WO | 0046717 A2 | 8/2000 |
| WO | 2005010731 A2 | 2/2005 |

OTHER PUBLICATIONS

Muath Alfawzan et al. Personal Loans Comparison Websites in Saudi Arabia: Challenges and Proposed Solution. 2018. 21st Saudi Computer Society National Computer Conference (NCC) (pp. 1-8). (Year: 2018).

Kantamneni, Nupur. Introducing Affirm Prequalification: Learn how it changes customer shopping behavior. Date: Jul. 25, 2018. https://www.affirm.com/business/blog/prequalification (Year: 2018).

* cited by examiner

SYSTEM AND METHOD FOR PROVIDING API VERSION CONTROL

CROSS-REFERENCE TO RELATED APPLICATIONS

This application is a continuation of U.S. patent application Ser. No. 16/882,286, filed May 22, 2020, which claims benefit of Provisional Application No. 62/852,202, filed May 23, 2019, the contents of each of the applications are hereby incorporated by reference in their entirety.

BACKGROUND

In an ecosystem where client product APIs serve as product interference and are powered by service applications that communicate with each other via streams, managing API versions may be cumbersome, error-prone, and complex. Various layers in the ecosystem evolve with incompatible changes. The problem becomes more exponential when a product API has multiple external clients and multiple partner APIs.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing API version control.

A client device may attempt to interface with a service application using an application executing on the client device. The APIs of the applications may be of a different version than the service application APIs. In this regard, the applications may transmit communications that are in a format not accepted by the service application APIs. To resolve this, a central (or public) API may receive the communication transmitted by the application's API. The central API may identify the version of the application's API based on the data of the communication. The central API may identify the different data fields in the communication. The central API may identify the service application, which is the intended recipient of the communication based on the communication. The central API may identify the version of the service application API corresponding to the service application. The central API may map the identified data fields in the communication to fields corresponding to a format accepted by the service application API. The central API may format the communication based on the mapped fields, to a format accepted by the service application API. The central API may forward the formatted communication to the service application.

By formatting the data to a format accepted by the service application API, the client device can freely communicate with the service application without being aware of the version of the service application API, and alternatively, the service application may communicate with the client device without being aware of the version of the application's API. The system provides a simplified API version management approach. The system avoids having to ensure the versions of the application's API and the service application API are the same. The system further avoids having to manage the versions of the application and service application APIs, saving time, and computational resources.

Figure 1:
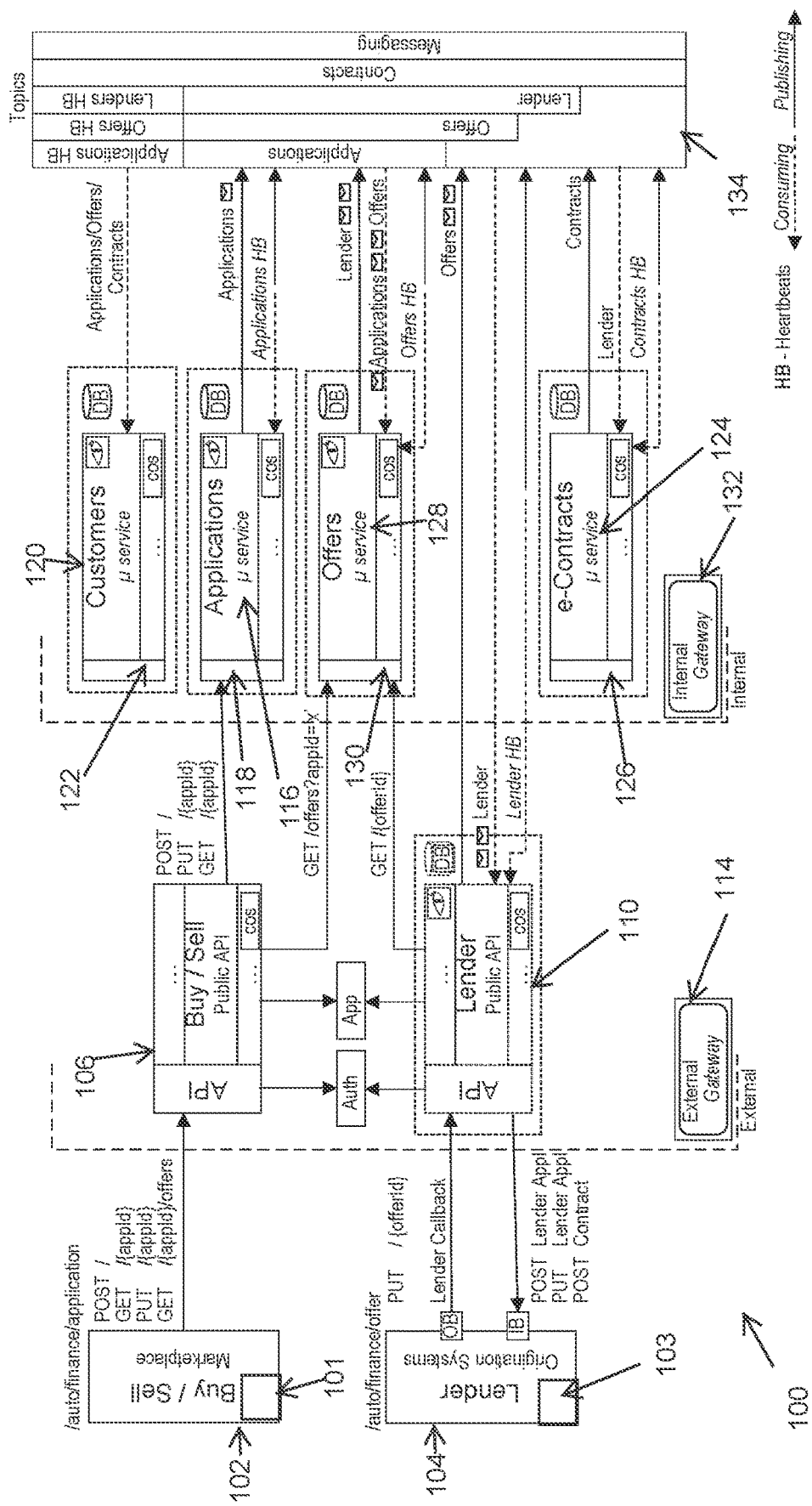
FIG. 1 is a block diagram of an example architecture implementing the system for providing version control according to an example embodiment.

FIG. 1 is a block diagram of an example architecture implementing the system for providing version control according to an example embodiment. The architecture may include a client device 102, a client device 104, a central API 106, a central API 110, a service application 116, a service application 120, a service application 124, a service application 128, a gateway 114, a gateway 132, and a publish-subscribe messaging system 134. The service applications 116, 120, 124, and 128 can be micro-services. The gateways 114 and 132 aggregate, secure, analyze, and relay data from devices in the network. The service applications 116, 120, 124, and 128 may use the publish-subscribe messaging system 134 to post messages based on topics such as applications, offers, contracts. The service applications 116, 120, 124, and 128 may be configured to retrieve the messages based on the topics.

The client device 102 may execute a buyer or seller application configured to obtain loan prequalification and pricing structures from service applications 116, 120, and 128. A service application is an application configured to process requests. In particular, the service application can be logic or set of instructions configured to perform one or more operations as a standalone application or a micro-service providing functionality as part of a distributed application The client device 102 may include a client device API 101. The client device 104 may execute a lender application configured to process loan offers for customers. The client device 104 may include a client device API 103.

The service application 116 may include a service application API 118. The service application 120 may include a service application API 122. The service application 124 may include a service application API 126. The service application 128 may include a service application API 130. The service application 116 may be an application or prequalification service application. The application or prequalification service application may process prequalification results for a loan application. The service application 120 may be a customers service application. The customers service application may store and manage prequalification results for each customer who has applied for a loan. The service application 128 may be an offers service application. The offers service application may generate and store pricing structures for loans. The offers service application may generate loan offers. The service application 124 may be an e-contracts service application. The e-contracts service application may store and manage contracts for loans for various lenders.

The client device 102 may interface with service applications 116, 120, and 128 through the central API 106, using the client API 101. The client API 101 may be a different version as compared to the service application APIs 122, 118, and 130. The client device API 101 may also be unaware of the versions of the service application APIs 122, 118, and 130. In view of this, in an attempt to interface with any of the service applications 116, 120, and 128, the client device API 101 may transmit a communication in a format not accepted by the service application APIs 122, 118, and 130.

In this regard, the central API 106 may receive the communication transmitted by the client device API 101. The central API 106 may identify the version of the client device API 101 based on the data of the communication. The central API 106 may identify the different data fields in the communication. Different versions of the client API 101 may correspond with a different format of data. The central API 106 may include a repository of all the formats of various versions of the client device APIs 101 and service application APIs. The central API may identify the version of the client device API 101 based on the format of the data. The central API 106 may keep track of the versions of the various client device APIs and service application APIs. The central API 106 may be periodically updated to account for new versions of the client device APIs 101 and service application APIs. The central API 106 may identify the service application, which is the intended recipient of the communication based on the communication. The central API 106 may identify the version of the service application API corresponding to the service application, which is the intended recipient of the communication. The central API 106 may map the identified data fields in the communication to fields corresponding to a format accepted by the service application API. The central API 106 may format the communication based on the mapped fields, to a format accepted by the service application API. The central API 106 may forward the formatted communication to the service application, which is the intended recipient.

The client device 104 may interface with the service application 128. The client device API 103 may be a different version as compared to the service application API 130. The client device API 103 may also be unaware of the versions of the service application API 130. In view of this, in an attempt to interface with service application 128, the client device API 103 may transmit a communication in a format not accepted by the service application API 130.

In this regard, the central API 110 may receive the communication transmitted by the client device API 103. The central API 110 may identify the version of the client device API 101 based on the data of the communication. The central API 110 may identify the different data fields in the communication. The central API 110 may identify the client device 104 is attempting to interface with service application 128. The central API 110 may identify the version of the service application API 130. The central API 110 may map the identified data fields in the communication to fields corresponding to a format accepted by the service application API 130. The central API 110 may format the communication based on the mapped fields, to a format accepted by the service application API 130. The central API 106 may forward the formatted communication to the service application 128.

Figure 2:
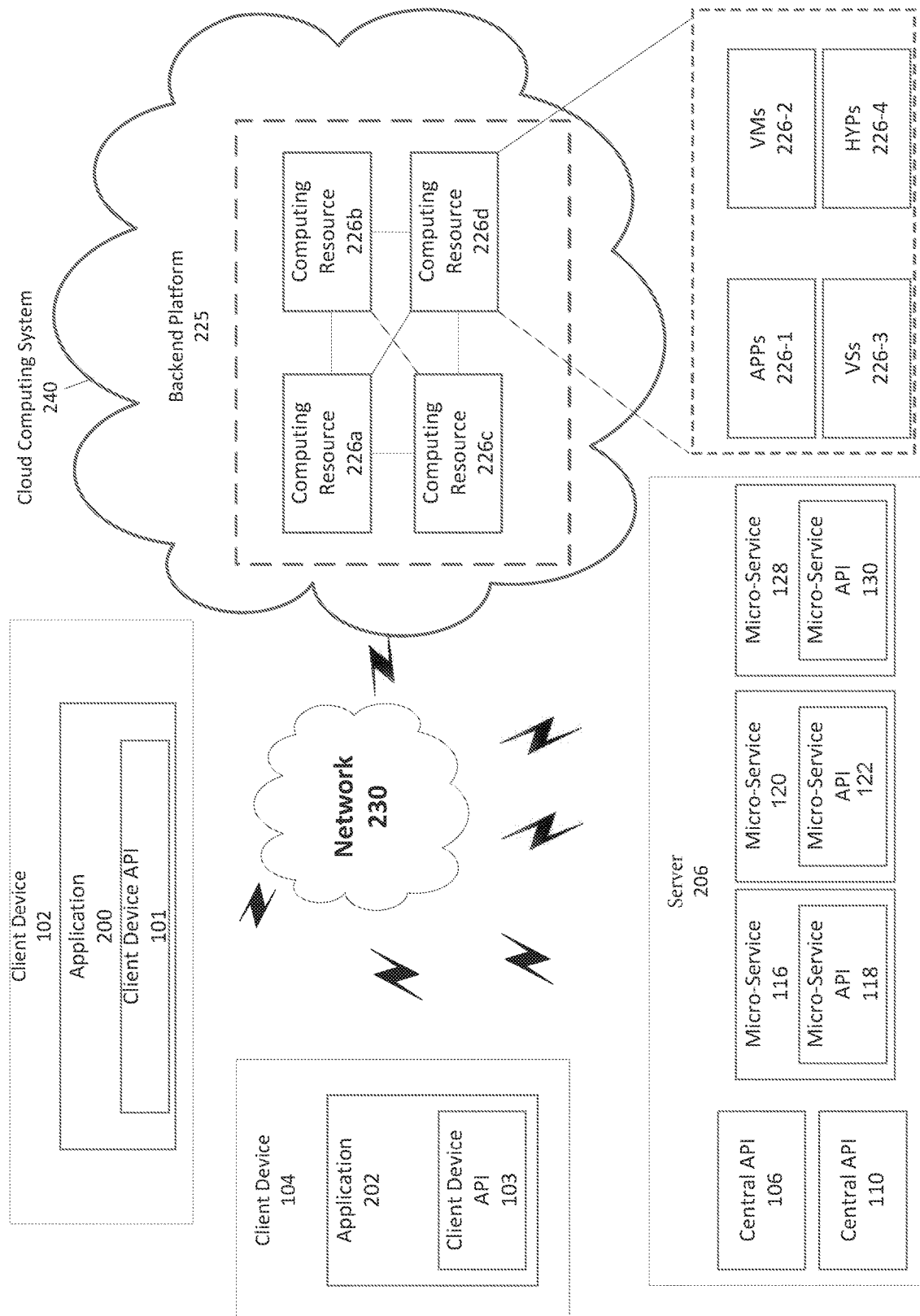
FIG. 2 is a block diagram of an example network environment implementing the system for providing version control according to an example embodiment.

FIG. 2 is a block diagram of an example network environment implementing the system for providing version control according to an example embodiment. The environment may include a client device 102, a client device 104, a backend platform 225, a cloud computing environment 240, a server 206, and a network 230. The devices of the environment may be connected through wired connections, wireless connections, or a combination of wired and wireless connections. The server 206 may reside fully or partially on the cloud computing system 240. The client device 102 may include an application 200 with a client device API 101. The client device 104 may include an application 202 and a client device API 103. The centralized system may include central API 106, central API 110, and service applications 116, 120, 128. Service application 116 may include a service application API 118. Service application 120 may include a service application API 122. Service application 128 may include a service application API 130. The server 206 may be a vault. The vault may be a self-contained environment. The server 106 may interface with other systems/devices using the central API 106 or the central API 110.

In an example embodiment, one or more portions of the network 230 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 225 may include a server or a group of servers. In an embodiment, the backend platform 225 may be hosted in a cloud computing environment 240. It may be appreciated that the backend platform 225 may not be cloud-based, or may be partially cloud-based. The server 206 may include one or more devices configured to interface with the backend platform 225.

The cloud computing environment 240 includes an environment that delivers computing as a service, whereby shared resources, services, etc. may be provided to the backend platform 225. The cloud computing environment 240 may provide computation, software, data access, storage, and/or other services that do not require end-user knowledge of a physical location and configuration of a system and/or a device that delivers the services. The cloud computing system 140 may include computer resources 226a-d.

Each computing resource 226a-d includes one or more personal computers, workstations, computers, server devices, or other types of computation and/or communication devices. The computing resource(s) 226a-d may host the backend platform 225. The cloud resources may include compute instances executing in the computing resources 226a-d. The computing resources 126a-d may communicate with other computing resources 226a-d by wired connections, wireless connections, or a combination of wired or wireless connections.

Computing resources 226a-d may include a group of cloud resources, such as one or more applications ("APPs") 226-1, one or more virtual machines ("VMs") 226-2, virtualized storage ("VS") 226-3, and one or more hypervisors ("HYPs") 226-4.

Application 226-1 may include one or more software applications that may be provided to or accessed by the server 206. Alternatively, the application 226-1 may eliminate a need to install and execute software applications on the client devices 102, 104. The application 226-1 may include software associated with backend platform 225 and/or any other software configured to be provided across the cloud computing environment 240. The application 226-1 may send/receive information from one or more other applications 226-1, by the virtual machine 226-2.

Virtual machine 226-2 may include a software implementation of a machine (e.g., a computer) that executes programs like a physical machine. Virtual machine 226-2 may be either a system virtual machine or a process virtual machine, depending upon the use and degree of correspondence to any real machine by virtual machine 226-2. A system virtual machine may provide a complete system platform that supports the execution of a complete operating system (OS). A process virtual machine may execute a single program and may support a single process. The virtual machine 226-2 may execute on behalf of a user and/or on behalf of one or more other backend platforms 225 and may manage the infrastructure of cloud computing environment 240, such as data management, synchronization, or long-duration data transfers.

Virtualized storage 226-3 may include one or more storage systems and/or one or more devices that use virtualization techniques within the storage systems or devices of computing resource 226a-d. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file-level and location where files are physically stored. This may enable optimization of storage use, server consolidation, and/or performance of non-disruptive file migrations.

Hypervisor 226-4 may provide hardware virtualization techniques that allow multiple operations systems (e.g., "guest operating systems") to execute concurrently on a host computer, such as computing resource 226a-d. Hypervisor 226-4 may present a virtual operating platform to the guest operating systems and may manage the execution of the guest operating systems multiple instances of a variety of operating systems and may share virtualized hardware resources.

In an embodiment, a user may attempt to interface with service applications 116, 120, or 128, using the client device 102 by launching the application 200. The client device API 101 may establish communication with the central API 106. The client device API 101 on the client device 102 may be of different versions than of the service application APIs 118, 122, 130. The client device API 101 may transmit a request, including user information for further processing by one of the service applications 116, 124, or 128. The client device API 101 may be unaware of the version of the service applications APIs 118, 126, or 130. Therefore, the client device API 101 may transmit the request and user information independent of knowledge of the version of the service application API.

The central API 106 may receive the request including the user information for further processing by one of the service applications 116, 120, or 128. The central API 106 may identify the version of the client device API 101. The central API 106 may identify the version of the client device API 101 based on the format of the request and user information received from the client device API 101. The central API 106 may also identify which service application is the intended recipient of the request and user information based on the type of request or user information. The central API 106 may identify the version of the identified service application. The central API 106 may identify which fields are included in the request and user information transmitted by the client device API 101. The central API 106 may map the request and user information to fields compatible with the version of the service application API. The central API 106 may format the mapped request and user information based on the fields compatible with the version of the service application API. The central API 106 may forward the formatted data to the identified service application (e.g., service application 116, 120, 128).

The identified service application may process the request and user information and may generate a response. The identified service application's API may transmit the response to the client device 102. The central application API 106 may receive the response. The central application API may identify the version of the client device API 101 and the identified service application API. The central API 106 may map the fields of the response to be compatible with the version of the client device API 101. The central API 106 may format the mapped response to a format compatible accepted by the client device API 101. The central API 106 may forward the formatted response to the client device API 101. The client device 101 may render the response on the GUI of the application 200. The client device 104 may interface with the server 206 similarly as described above with respect to client device 102.

In an embodiment, a user may attempt to interface with service applications 128, using client device 102 by launching the application 200. The application 200 may transmit a request and user information using the client device API 101. The central API 106 may receive the request and user information from the client device API 101. The central API 106 may format the request and user information to a format compatible with the version service application 130 API, as described above. The central API 106 may forward the formatted request and user information to the service application 128.

The service application API 130 may receive the formatted request and user information. The service application 128 may attempt to process the request using the user information. To complete the request, the service application 128 may transmit the request and user information to the client device 104 to complete the processing of the request using the user information. The central API 110 may identify the version of the client device API 103. Different versions of the client API 103 may correspond with a different format of data. The central API 110 may include a repository of all the formats of various versions of the client device APIs 103 and service application APIs. The central API may identify the version of the client device API 103 based on the format of the data. The central API 110 may keep track of the versions of the various client device APIs and service application APIs. The central API 110 may be periodically updated to account for new versions of the client device APIs 103 and service application APIs. The central API 110 may map the fields of the request and user information to be compatible with the version of the client device API 103. The central API 110 may format the mapped request and user information to a format compatible or accepted by the client device API 103. The central API 110 may forward the formatted request and user information to the central device API 103.

The application 202 executing on the client device 104 may process the request using the user information and transmit the processed information back to the server 206. The central API 110 may map the fields of the processed information to be compatible with the version of the service application API 130. The central API 110 may format the mapped processed information to a format compatible or accepted by the client device API 103. The central API 110 may forward the processed information to the service application API 130. The service application 128 may complete processing the request transmitted by the client device 102 based on the processed information and transmit a response back to the client device 102.

The central application API 106 may receive the response. The central application API may identify the version of the client device API 101 and the identified service application API. The central API 106 may map the fields of the response to be compatible with the version of the client device API 101. The central API 106 may format the mapped response to a format compatible or accepted by the client device API 101. The central API 106 may forward the formatted response to the client device API 101. The client device 102 may render the response on the GUI of the application 200.

As a non-limiting example, the client device 102 may be a buyer device or seller device. The client device 102 may be used to obtain loans for products intended for purchase. The server 206 may be configured to process the loans. Service application 118 may be configured to process prequalification, service application 120 may be a customers service application configured to manage and store prequalification results for the customers, service application 128 may generate pricing structures for the loan. The client device 104 may be used by lenders to generate offers and interface with the server 206 when the offer is being finalized.

A user may transmit a prequalification request including user information from the client device 102 using the application 200. The client device API 101 may transmit the prequalification request and user information to the server. The central API 106 may identify the version of the client device API 101. The central API 106 may also identify which service application is the intended recipient of the request and user information based on the type of request or user information. In this example, the central API 106 may identify that the prequalification request and user information is to be transmitted to the service application 128 for generating prequalification results. The central API 106 may identify the version of the identified service application API 118. The central API 106 may identify which fields are included in the prequalification request and user information transmitted by the client device API 101. For example, the fields may include a user name, social security number, address, employment information, and/or the like. The central API 106 may map the request and user information to fields compatible with the version of the service application API 118. The central API 106 may format the mapped request and user information based on the fields compatible with the version of the service application API 118. For example, the version of the service application API 118 may require the format of the name to be "Last Name, First Name Middle Initial." The central API 106 may format the request and user information such that the format of the user's name is "Last Name, First Name Middle Initial." The central API 106 may forward the formatted data to the service application 116.

The service application 116 may interface with third party credit bureaus to retrieve user credit information using user information. The service application 116 may request the third party credit bureaus to initiate a soft pull. Soft pulls are soft credit inquires that do not affect the user's credit score. The service application 116 may retrieve prequalification information associated with various lenders. Each lender may have its own rules, methodologies, or algorithms on how to processes prequalification requests.

The service application 116 may process, in parallel, the user's prequalification request for each of the various lenders using the user's personal information, the received credit information, information about the specific product, information about the third-party, and the prequalification information associated with each respective lender. As described above, the prequalification may be different for each lender. For example, each lender may require different thresholds of employment information, salary, and/or credit scores.

The service application 116 may generate prequalification results, in response to processing the user's prequalification request for each of the multiple lenders. The prequalification results can include a decision on whether the lender has prequalified a user for a loan for purchasing the specific product. In an embodiment, the prequalification results may also include information associated with the loan, such as a range of possible Annual Percentage Rates (APRs) and terms and conditions of the loans. The service application 116 may transmit the prequalification results to the client device 102.

The central application API 106 may receive the prequalification results. The central application API may identify the version of the client device API 101 and the identified service application API. The central API 106 may map the fields of the prequalification results to be compatible with the version of the client device API 101. The central API 106 may format prequalification results in the mapped response to a format compatible accepted by the client device API 101. The central API 106 may forward the formatted prequalification results to the client device API 101. The client device 101 may render the prequalification results on the GUI of the application 200.

The client device 102 may transmit a pricing request for the specific product using the application 200. The client device API 101 may transmit the pricing request and specific product information to the server 206. The central API 106 may receive the pricing request and specific product information. The central API 106 may format the pricing request and specific product information to a format accepted by the service application API 130, so that service application 128 may generate a pricing structure for the loan.

The service application 128 may identify that prior to generating the pricing structure, service application 128 may determine whether the specific product is eligible for the loan. The service application 128 may determine, in parallel, whether the specific product is eligible for a loan from a given lender based on the information associated with the specific product and information associated with product eligibility for each of the respective lenders. The information associated with product eligibility may be different for each lender. For example, each lender may have different requirements for make, model, year, mileage, price, and/or the like.

Subsequent to confirming the specific product is eligible for the loan, the service application API 130 may retrieve methodologies for building pricing structures for each of the one or more lenders. The methodologies may include using Bayesian regression algorithms, decision trees, pricing girds, or various equations to price a loan offer. The methodologies may also provide sources for retrieving certain information. The service application 128 may process and build, in parallel, a loan offer based on the information associated with the request for building an offer for each of the one or more lenders using information associated with pricing for each of the respective lenders. Additionally, each lender may use a different methodology for calculating pricing for a loan offer.

The service application 128 may generate pricing structures for loans from various lenders. The pricing structures may include loan amounts, interest rates, and terms and conditions of the automobile loan. The service application 128 may transmit the pricing structures to the client device 102.

The central application API 106 may receive the pricing structures. The central application API may identify the version of the client device API 101 and the identified service application API. The central API 106 may map the fields of the pricing structures to be compatible with the version of the client device API 101. The central API 106 may format the pricing structures and the mapped response to a format compatible accepted by the client device API 101. The central API 106 may forward the formatted pricing structures to the client device API 101. The client device 101 may render the pricing structures on the GUI of the application 200.

The client device 102 may transmit a purchase request for the specified product using the application 200, based on the received pricing structures. The client device API 101 may transmit the purchase request to the server 206. The central API 106 may receive the purchase request and may format the purchase request in a format accepted by the service application API 130, such that the service application 128 may generate an offer in response to the purchase request. The central API 106 may format the purchase request, as described above. The central API 106 may forward the purchase request to the service application 128.

The service application API 130 may receive the formatted purchase request. The purchase request may include user and product information. The service application 128 may generate a loan offer for the specific product based on an earlier generated pricing structure for the specific product and user, the user information, and the product information. To complete the request, the service application 128 may transmit the offer to the client device 104 so that the lender may accept the loan offer. The central API 110 may identify the version of the client device API 103. The central API 110 may map the fields of the loan offer to be compatible with the version of the client device API 103. The central API 110 may format the mapped loan offer to a format compatible or accepted by the client device API 103. The central API 110 may forward the formatted loan offer to the central device API 103.

The application 202 executing on the client device 104 may process/accept the loan offer and transmit the accepted loan offer back to the server 206. The central API 110 may map the fields of the accepted loan offer to be compatible with the version of the service application API 130. The central API 110 may format the mapped accepted loan offer to a format compatible or accepted by the client device API 103. The central API 110 may forward the accepted loan offer to the service application API 130. The service application 128 may complete processing of the loan offer and loan offer to the client device 102.

The central application API 106 may receive the loan offer. The central application API may identify the version of the client device API 101 and the identified service application API. The central API 106 may map the fields of the loan offer to be compatible with the version of the client device API 101. The central API 106 may format the mapped loan offer to a format compatible or accepted by the client device API 101. The central API 106 may forward the formatted loan offer to the client device API 101. The client device 101 may render the loan offer on the GUI of the application 200.

Figure 3:
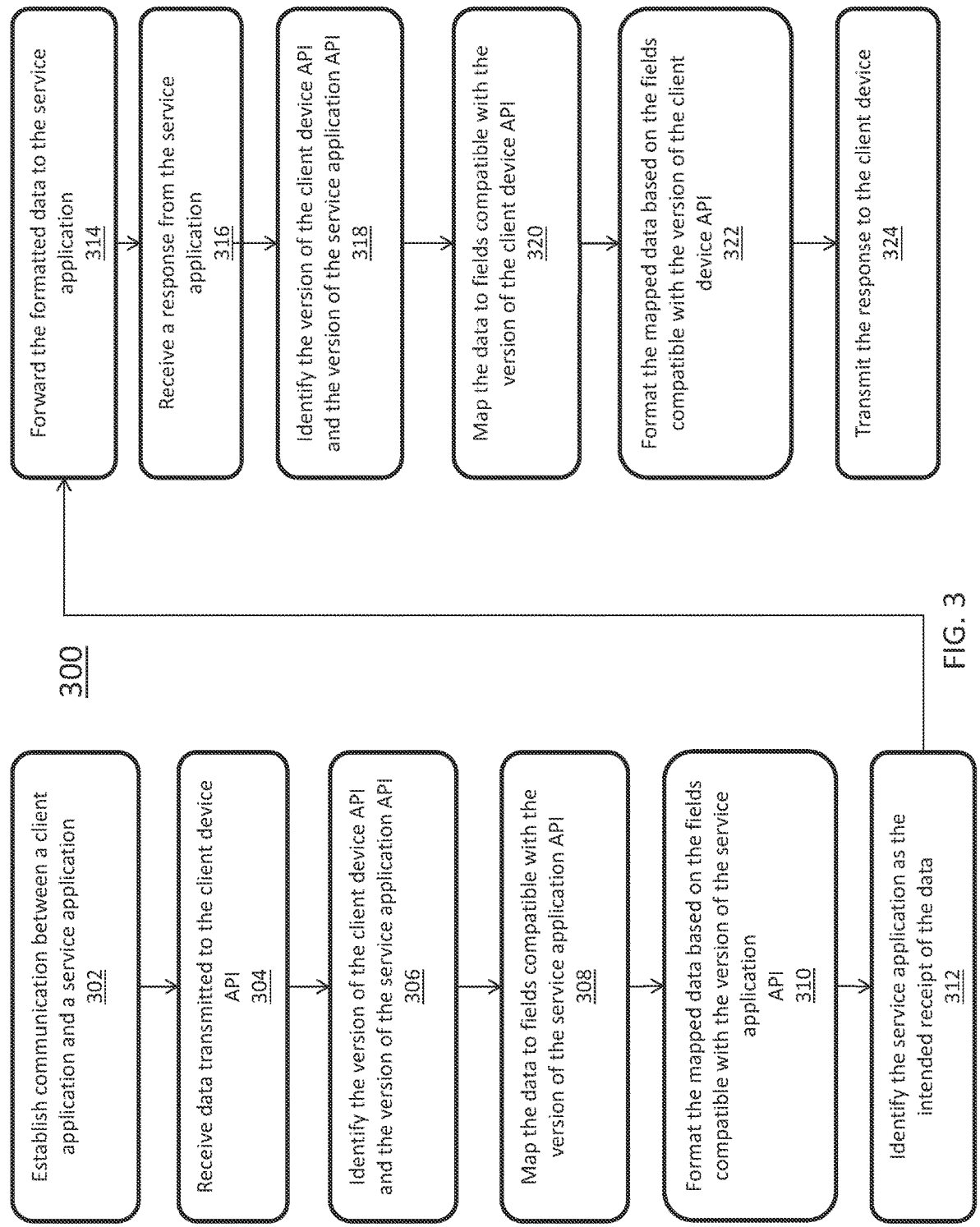
FIG. 3 is a flowchart illustrating the process for providing version control according to an example embodiment.

FIG. 3 is a flowchart illustrating the process for providing version control according to an example embodiment. It is to be appreciated the operations may occur in a different order, and some operations may not be performed. Merely as an example, the flow of data will be described with respect to FIGS. 1 and 2.

In operation 302, a client device uses a central application program interface (API) to establish communication between a client application and a service application. The service application can be a service application. The client application includes a client device API, and the service application includes a service application API, the client device API may be a different version of the service application API. The service application API may correspond with a service application.

In operation 304, the central API receives data transmitted from the client device API. The data may be part of a request. For example, the request may correspond with a request to generate a prequalification result or pricing of a loan.

In operation 306, the central API identifies the version of the client device API and the version of the service application API of the micro-service. Different versions of the client API may correspond with a different format of data. The central API may include a repository of all the formats of various versions of the client device APIs and service application APIs. The central API may identify the version of the client device API based on the format of the data. The central API may keep track of the versions of the various client device APIs and service application APIs. The central API may be periodically updated to account for new versions of the client device APIs and service application APIs.

In operation 308, the central API maps the data to fields compatible with the version of the service application API.

In operation 310, the central API formats the mapped data based on the fields compatible with the version of the service application API. The formatted data may be a formatted request compatible with the version of the service application API.

In operation 312, the central API identifies the service application as the intended recipient of the data. The central API may identify the service application as the intended recipient of the data based on the request.

In operation 314, the central API forwards the formatted data to the service application.

In operation 316, the central API receives a response from the service application. The service application may process the request and generate a response to the request. The response may include data generated based on processing the request.

In operation 318, the central API identifies the version of the client device API and the version of the micro-service API of the service application. The central API may determine that the central API is the intended recipient. Furthermore, the central API may determine the version of the client device API based on the repository to versions. The central API may determine the version of the service application API based on the format of the response.

In operation 320, the central API maps the data of the response to fields compatible with the version of the client API.

In operation 322, the central API formats the mapped data based on the fields compatible with the version of the client API.

In operation 324, the central API transmits the response from the service application API to the client device.

Figure 4:
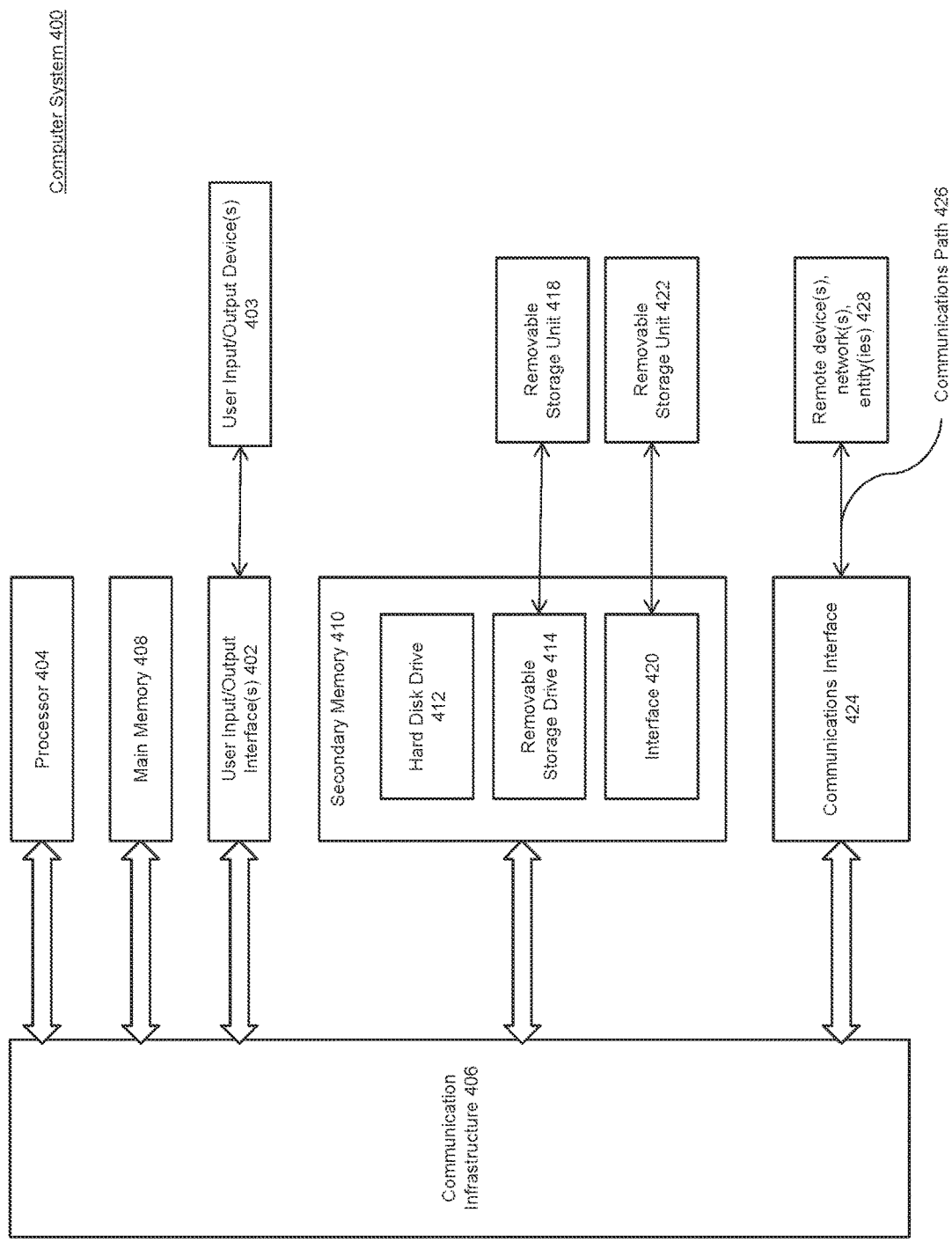
FIG. 4 is a block diagram of example components of a computing system according to an embodiment.

FIG. 4 is a block diagram of example components of device 400. One or more computer systems 400 may be used, for example, to implement any of the embodiments discussed herein, as well as combinations and sub-combinations thereof. Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414.

Removable storage drive 414 may interact with a removable storage unit 418. Removable storage unit 418 may include a computer-usable or readable storage device having stored thereon computer software (control logic) and/or data. Removable storage unit 418 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 414 may read from and/or write to removable storage unit 418.

Secondary memory 410 may include other means, devices, components, instrumentalities, or other approaches for allowing computer programs and/or other instructions and/or data to be accessed by computer system 400. Such means, devices, components, instrumentalities, or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 by communication path 426.

Computer system 400 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A method for providing version control, the method comprising:
   receiving, by one or more computing devices providing a central application program interface (API), a request from a client application API of a client application intended to be transmitted to a service application, wherein the client application API is a different version than a service application API, the version of the service application API being unknown to the client application API;
   identifying, by the one or more computing devices, at the central API, the version of the client application API and the version of the service application API of the service application;
   mapping, by the one or more computing devices, data included in the request to fields compatible with the version of the service application API;
   formatting, by the one or more computing devices, the mapped data based on a predetermined format corresponding to each of the fields, wherein the predetermined format corresponding to each of the fields is compatible with the version of the service application API; and
   forwarding, by the one or more computing devices, the formatted data to the service application.

2. The method of claim 1, further comprising identifying, by the one or more computing devices, the service application from a plurality of service applications as an intended recipient of the request, using the central API.

3. The method of claim 2, wherein the central API identifies the service application as an intended recipient of the data based on the request.

4. The method of claim 1, further comprising transmitting, by the one or more computing devices, a response from the service application API to a client device, using the central API.

5. The method of claim 1, wherein the version of the service application API is configured to receive data in a format of the formatted data and the fields correspond with the format of data accepted by the version of the service application API.

6. The method of claim 1, wherein the central API identifies the version of the client application API based on a format of the data received from the client application API.

7. The method of claim 1, wherein the service application uses publish-subscribe messaging system to communicate with other service applications.

8. A system for providing version control, the system comprising:
   a memory; and
   a processor coupled to the memory, wherein the processor is configured to:
   receive, at a central application program interface (API), a request from a client application API of a client application intended to be transmitted to a service application, wherein the client application API is a different version than a service application API, the version of the service application API being unknown to the client application API;
   identify, at the central API, the version of the client application API and the version of the service application API of the service application;
   map data included in the request to fields compatible with the version of the service application API;
   format the mapped data based on a predetermined format corresponding to each of the fields, wherein the predetermined format corresponding to each of the fields is compatible with the version of the service application API; and
   forward the formatted data to the service application.

9. The system of claim 8, wherein the processor is further configured to identify the service application from a plurality of service applications as an intended recipient of the request, using the central API.

10. The system of claim 9, wherein the central API identifies the service application as an intended recipient of the data based on the request.

11. The system of claim 8, wherein the processor is further configured to transmit a response from the service application API to a client device, using the central API.

12. The system of claim 8, wherein the version of the service application API is configured to receive data in a format of the formatted data and the fields correspond with the format of data accepted by the version of the service application API.

13. The system of claim 8, wherein the central API identifies the version of the client application API based on a format of the data received from the client application API.

14. The system of claim 8, wherein the service application uses publish-subscribe messaging system to communicate with other service applications.

15. A non-transitory computer-readable medium having instructions stored thereon that, when executed by at least one computing device, cause the at least one computing device to perform operations for providing version control, the operations comprising:
   receiving, at a central application program interface (API), a request from a client application API of a client application intended to be transmitted to a service application, wherein the client application API is a different version than a service application API, the version of the service application API being unknown to the client application API;
   identifying, at the central API, the version of the client application API and the version of the service application API of the service application;
   mapping data included in the request to fields compatible with the version of the service application API;
   formatting the mapped data based on a predetermined format corresponding to each of the fields, wherein the predetermined format corresponding to each of the fields is compatible with the version of the service application API; and
   forwarding the formatted data to the service application.

16. The non-transitory computer-readable medium of claim 15, wherein the operations further comprise identifying the service application from a plurality of service applications as an intended recipient of the request, using the central API.

17. The non-transitory computer-readable medium of claim 16, wherein the central API identifies the service application as an intended recipient of the data based on the request.

18. The non-transitory computer-readable medium of claim 15, wherein the operations further comprise transmitting a response from the service application API to a client device, using the central API.

19. The non-transitory computer-readable medium of claim 15, wherein the version of the service application API is configured to receive data in a format of the formatted data and the fields correspond with the format of data accepted by the version of the service application API.

20. The non-transitory computer-readable medium of claim 15, wherein the central API identifies the version of the client application API based on a format of the data received from the client application API.

* * * * *